May 10, 1960 R. GUENTHER 2,936,431

NEGATIVE IMPEDANCE CIRCUIT

Filed May 13, 1957 2 Sheets-Sheet 1

INVENTOR
R. GUENTHER
BY W L Keefauver
ATTORNEY

May 10, 1960 R. GUENTHER 2,936,431

NEGATIVE IMPEDANCE CIRCUIT

Filed May 13, 1957 2 Sheets-Sheet 2

INVENTOR
R. GUENTHER
BY W. L. Keefauver
ATTORNEY 2,936,431
Patented May 10, 1960

2,936,431

NEGATIVE IMPEDANCE CIRCUIT

Richard Guenther, Chatham, N.J., assignor to Bell Telephone Laboratories, Incorporated, New York, N.Y., a corporation of New York Application May 13, 1957, Serial No. 658,821

5 Claims. (Cl. 333—80)

This invention relates to negative impedance circuits, and more particularly to transistor circuits exhibiting a complex negative impedance at their input terminals.

Although the discussion below is directed toward application of the present invention in telephone systems, it should be understood that the invention is not limited to such use, but may be used wherever negative impedance circuits are employed.

The need for economical improvement of telephone circuits in the exchange area grows with the ever increasing demand for new facilities. Approximately 1½ million local telephone trunks are in service today, and they are being added at a rate of 100,000 per year. The use of fine gauge cables with negative impedance loading could be one way of economically providing for this growth. Another approach, which may be economical in exchange areas, is to employ carrier or pulse techniques.

In voice frequency cables, however, such as generally used in exchange area systems, still another approach is to employ multi-tubed negative impedance converters of the type disclosed in Patent No. 2,582,498 and Patent No. 2,742,616, which issued to J. L. Merrill, Jr. on January 15, 1952, and April 17, 1956, respectively. These impedance converters, although relatively complex and expensive when compared with a negative impedance circuit having only one active element, have come into wide use and have proved highly advantageous. They are called converters to distinguish them from the class of negative impedance circuits to which the present invention is related, because these converters (which are four-terminal devices) serve to transform a positive impedance to substantially its negative counterpart. The negative impedance presented by such converters at one terminal pair is varied by varying the value of a positive impedance network connected between the other terminal pair. The illustrative circuits which will be described below have only one active element and present a negative impedance by virtue of a mechanism physically quite different from that of the above-named converters.

In view of the constantly increasing demand for exchange area facilities, there remains a need for a more simple, compact, and inexpensive negative impedance loading circuit, and it is to these ends that the present invention is directed.

It is therefore an object of the present invention to simplify negative impedance loading circuits.

It is a further object to enhance the stability of systems in which negative impedance circuits are used.

A related object is to shape the impedance characteristic of such circuits over a desired frequency band, in accordance with the transmission and stability requirements of systems in which they are utilized.

Still another object of the present invention is to reduce the power requirements of negative impedance circuits.

These objects and others which will be developed are attained by employing transistors of the type exhibiting avalanche breakdown (hereafter referred to as avalanche transistors). In one specific embodiment described in more detail below, a parallel resistor-capacitor network is connected between the base and emitter electrodes of an avalanche transistor operated in the avalanche break down region. The emitter and collector electrodes are employed as the terminals of a two-terminal negative impedance circuit. The impedance characteristic of the circuit is made to approach an ideal characteristic by utilizing the capacitor to vary the alternating-current potential between the base and emitter electrodes of the avalanche transistor in accordance with varying signal frequencies. It should be noted that by utilizing a capacitor which has an appreciable reactance at signal frequencies, deliberate provision is made for a desired reactive component of input impedance.

The phenomenon of avalanche breakdown is described in an article, "Avalanche Breakdown in Silicon," written by K. B. McAfee in 94 Physical Review 877, May 15, 1954. It is also described in K. B. McAfee patent application Serial No. 340,529, filed March 5, 1953, which issued as Patent No. 2,790,034 on April 23, 1957, and K. G. McKay patent application Serial No. 464,737, filed October 26, 1954 which issued as Patent No. 2,908,871 on October 13, 1959. As set forth in these references, it has been recognized that a substantial multiplication of current occurs in the depletion region of a reverse biased p-n junction when the field in the vicinity of that junction and the distance across which it is imposed attain a critical relationship. This phenomenon has been referred to as avalanche breakdown and has been shown to result in current multiplication within the semi-conductive body, making the current amplification factor greater than unity after avalanche breakdown occurs. The avalanche transistor, when operated in the avalanche breakdown region, may be advantageously employed in a negative impedance circuit of the type herein disclosed.

The nature of the present invention and various objects, features, and advantages in addition to those pointed out above will appear more fully from the following description of the embodiments of the invention which are illustrated in the drawings.

Figure 1:
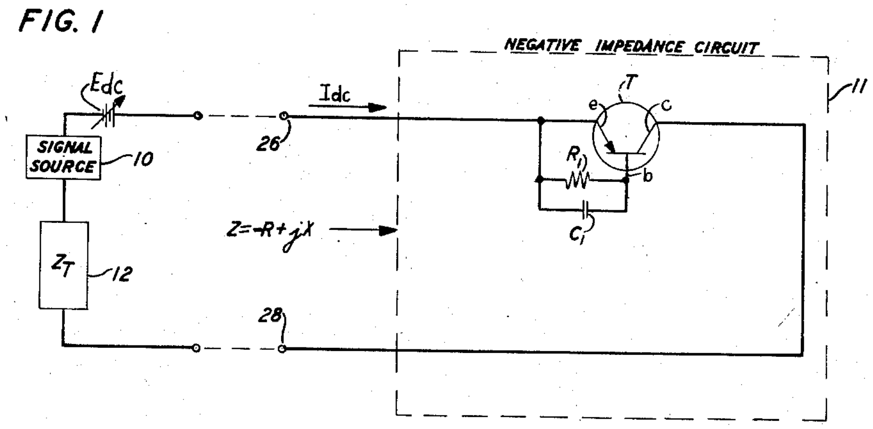
Fig. 1 is a partially schematic diagram of an illustrative embodiment of a negative impedance circuit in accordance with the present invention.

Proceeding now to a more detailed consideration and analysis of the invention as shown in the drawings, the illustrative embodiment of Fig. 1 depicts an avalanche transistor T having its emitter electrode *e* and base electrode *b* interconnected by a capacitor $C_1$ and a resistor $R_1$. The function of capacitor $C_1$ will be discussed in more detail below, but it should be noted at this point that it does not serve the purpose of a by-pass capacitor. On the contrary, its value of capacitance is chosen so that it presents an appreciable impedance to signal frequencies. Its primary purpose is to shape the input impedance characteristic of the negative impedance circuit 11 and its accomplishes this by varying the input impedance Z with varying signal frequency. Connected in series with the emitter electrode *e* and collector electrode *c* of transistor T is a signal source 10, representing any source of signals whose frequency may vary. Impedance 12 represents the total impedance in the system, except for that represented by negative impedance circuit 11; and included in impedance 12 are the internal impedance of signal source 10 and that of any load circuits. Of course, the real component of impedance 12 must be numerically greater than the negative real component of input impedance Z, in order to prevent oscillation of the system. The left-hand portion of the system depicted in Fig. 1 is included merely to facilitate discussion of the present invention, and may be rearranged or modified in a number of ways obvious to those skilled in the art.

Bias source $E_{dc}$ is adjusted to bias transistor T so that the transistor operates in the avalance breakdown region. As previously recognized, after avalanche breakdown, an avalanche transistor exhibits a voltage-current characteristic very similar to that of a gas tube after the tube has been rendered conductive; substantially zero resistance is then exhibited between the emitter and collector electrodes. Addition of the resistor-capacitor network $R_1$—$C_1$ connected between the emitter electrode *e* and base electrode *b* of transistor T transforms this gas-tube-like, voltage-current characteristic to one having a wide region of negative slope.

As mentioned above, the impedance characteristic of negative impedance circuit 11 is shaped by capacitor $C_1$; in fact, it is this means by which the impedance characteristic may be shaped which makes the avalanche transistor highly desirable for use in a negative impedance loading circuit.

Figure 2:
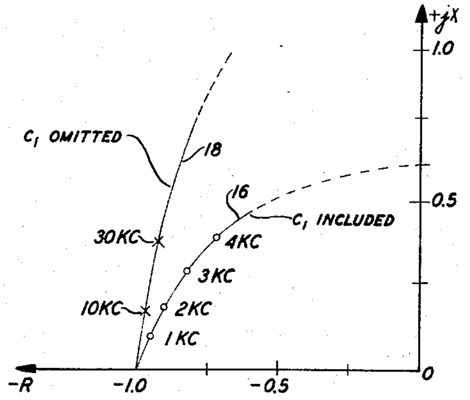
Fig. 2 is a plot comparing the impedance characteristic of the negative impedance circuit of Fig. 1 with that of the same circuit in the absence of capacitor $C_1$.

The negative impedance characteristics plotted in Fig. 2 as a function of frequency have been shown in order to make more clear the function of capacitor $C_1$ of Fig. 1. Curve 16 represents a typical impedance characteristic of the negative impedance circuit 11 depicted in Fig. 1. Curve 18 represents the type of impedance characteristic exhibited by a negative impedance circuit similar to that of Fig. 1, but not including the capacitor $C_1$. The optimum characteristic of a negative impedance circuit is dependent primarily upon the range of frequencies which the system, in which the circuit is to be used, shall be required to transmit. This may be explained from a design standpoint. In the design of a negative impedance circuit, it is desirable to shape the impedance characteristic of the circuit so that the characteristic has negative values of resistance only over a desired range of frequencies. By doing this, the designer obviates the need for precautionary design against instability of the system in which the circuit is used, when frequencies outside the prescribed range are manifest in the system. For purposes of comparison a few values of frequency have been indicated on curves 16 and 18. Note that curve 18 tends toward more positive values of resistance at a much slower rate than does curve 16. Curve 18 may begin exhibiting positive values (not shown) of resistance at a frequency of, say, 100 kc., whereas curve 16 may be shaped to do so at a frequency within the audio range. Curve 16 may be advantageously shaped to present a negative impedance solely within a desired frequency band by adjusting capacitor $C_1$ to a proper value. In the above-mentioned illustrative embodiment of the present invention, namely, in exchange area telephone systems, capacitor $C_1$ would be fixed (it may well be a variable capacitor) at a value such that the negative impedance circuit would present negative values of impedance only over the voice frequency band, as is desired. In general, the upper limit of frequency, at which negative values of impedance are presented, may be decreased by increasing the value of $C_1$.

Experimental results substantiating the shaping effect of capacitor $C_1$ have been obtained using different types of avalanche transistors, different values for resistor $R_1$ and capacitor $C_1$, and different values of bias current. It may be helpful for illustrative purposes to include here the data obtained in one such experimental analysis in which the negative impedance circuit of Fig. 1 was used the data tabulated below were obtained using a typical avalanche transistor, a value of 270 ohms for resistor $R_1$, a value of 0.26 microfarad for capacitor $C_1$, and a bias current $I_{dc}$ of 6 milliamperes.

The following values of the real and imaginary components of the input impedance Z were obtained at various frequencies within the audio band:

| Frequency (c.p.s.) | Resistance (Ohms) | Inductive Reactance (Ohms) |
|---|---|---|
| 1,000 | −453 | 55.5 |
| 3,000 | −424 | 128 |
| 5,000 | −392 | 198 |
| 10,000 | −251 | 284 |
| 20,000 | +38 | 337 |

The above values of resistance and reactance, when plotted on a complex impedance plane, will form a characteristic similar to the one represented by curve 16 in Fig. 2.

A feature of the present invention is that the net loss control of a transmission line can be effected in a practical manner from one termination. It is desirable that the net loss of such a line be kept substantially constant and as near to a lower limit as possible, the lower limit being determined by stability factors. One way of doing this is to control the over-all loss of a line, including any number of negative impedance circuits of the type depicted in Fig. 1, by varying the bias current $I_{dc}$ from one end of the line in accordance with net loss measurements.

Figure 3:
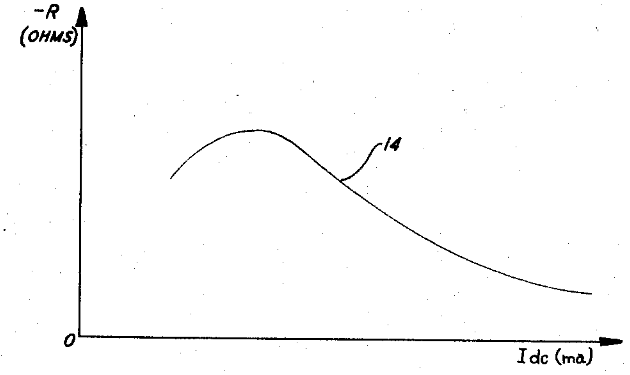
Fig. 3 is a plot depicting the variation (at low signal frequencies) in the negative input resistance of the circuit of Fig. 1 as a function of bias current.

The variation (at low signal frequencies) of the negative input resistance of Fig. 1 as a function of the bias current $I_{dc}$ is shown by curve 14 of Fig. 3. It is seen that by simply varying the bias current $I_{dc}$, the net loss of a system utilizing negative impedance circuits of the type described herein may be controlled. Thus, the gain of the negative impedance circuit 11 can be varied within prescribed limits, consistent with the stability requirements of the system.

Figure 4:
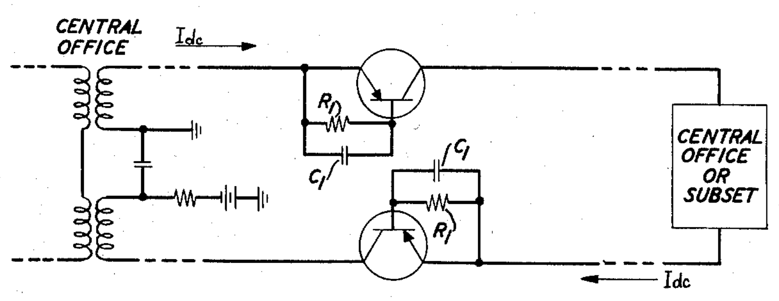
Figs. 4, 5, and 6 show methods of utilizing the present invention for transmission line applications.
Figure 5:
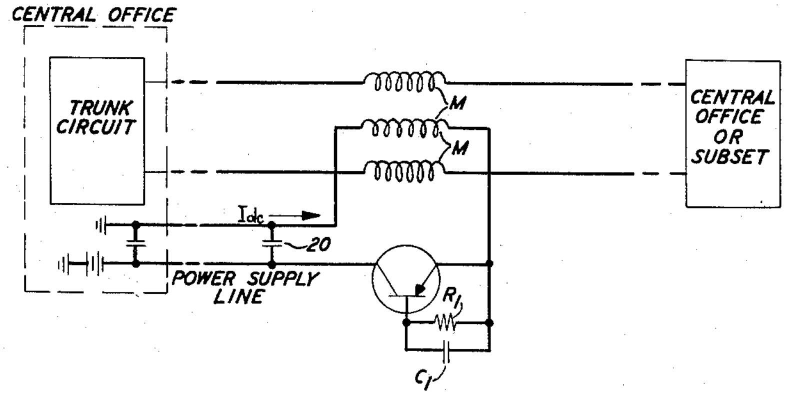
Figure 6:
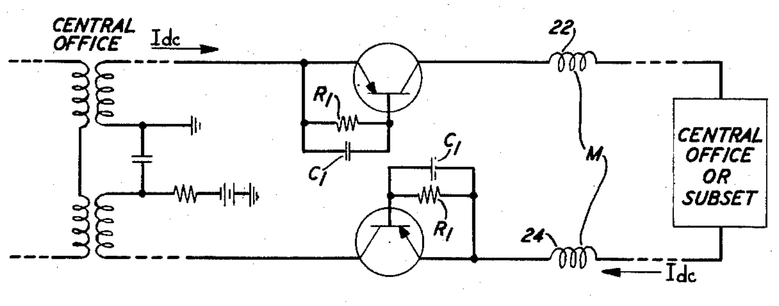

Figs. 4, 5 and 6 have been included to indicate a few of the ways of utilizing the negative impedance circuit of Fig. 1 in a loading section of a transmission line. The different arrangements may be separated into two classes. In one class the power required to activate the circuit is fed over the transmission line. Figs. 4 and 6 are representative of this class. In the other class, the required power is provided by a separate line or medium. Fig. 5 illustrates the latter class.

If the negative impedance circuits to be used in the line have substantially the same impedance characteristics, i.e., if there is substantially no variation between the gains which they each supply the line, the direct-insertion arrangement of Fig. 4 is adequate.

However, if variations between the characteristics of the circuits are intolerable, the arrangement of Fig. 5 may be used. Inductive coupling of one negative impedance circuit with both sides of the line eliminates the balance problem, but then direct-current power has to be supplied over a separate cable pair. Capacitor 20 is an alternating-current by-pass capacitor.

The arrangement of Fig. 6 is similar to that of Fig. 4 except that the balance problem is alleviated by the use of mutually-coupled balancing coils 22 and 24. These coils also serve to substantially impede any longitudinal current which may be induced in the line.

It is to be understood that the above-described circuits are illustrative of the application of the principles of the invention and that other circuits may be devised by those skilled in the art without departing from the spirit and scope of the invention.

An application of J. J. Ebers and S. L. Miller, Serial No. 515,866, filed June 16, 1955, which issued as Patent No. 2,831,984 on April 22, 1958, concerns related subject-matter.

What is claimed is:

1. A circuit having two input terminals and a variable frequency energy source connected between said terminals comprising an avalanche breakdown transistor having collector, emitter, and base electrodes, said collector electrode being connected to one of said input terminals and said emitter electrode being connected to the other of said input terminals, and a network including a resistor and a capacitor each connected between said base and emitter electrodes and each substantially impeding signals from said variable frequency signal energy source, said network providing said two-terminal circuit with a predetermined complex negative input impedance comprising a negative real component and a positive imaginary component, said real component approaching positive values with increasing frequency of said variable frequency source at a rate substantially dependent upon the value of capacitance of said capacitor.

2. In combination, a signal source, a load circuit and a two-terminal negative impedance circuit for interconnecting said source and said load, said negative impedance circuit comprising a transistor capable of avalanche multiplication and having base, emitter and collector electrodes, means connecting one of the terminals of said circuit to said emitter electrode and means connecting the other of said terminals to said collector electrode, means for biasing said transistor to operate in its avalanche multiplication region, and a circuit including a capacitor and a resistor each connected between said base and emitter electrodes, said capacitor having a substantial impedance at signal frequencies.

3. A transmission line comprising periodically spaced, series-connected transistors capable of avalanche multiplication whose total negative resistance is sufficient to render the net loss of said line substantially zero consistent with the stability requirements of said line, each of said transistors having base, emitter, and collector electrodes, and an individual bias means for biasing all of said transistors to operate within their avalanche breakdown regions, capacitive means associated with each of said avalanche transistors for shaping the input impedance characteristic thereof, said capacitive means being connected between said base and emitter electrodes, and the collector-emitter path of each of said transistors being serially inserted in said line.

4. A signal wave transmission system for the transmission of a specified band of signal frequencies comprising an avalanche transistor, capable of avalanche multiplication, having a pair of transconductive electrodes and an electrode common to said pair; capacitive means intercoupling the common electrode of said transistor with one of said transconductive electrodes for shaping the input impedance characteristic of said avalanche transistor in conformance with the gain requirements of said specified band of frequencies; and means for biasing said transistor to operate within its avalanche breakdown region, said capacitive means having a value of capacitance to ensure that said input impedance shall become positive approximately at the upper limit of said specified band of frequencies.

5. A signal wave transmission line, for transmitting waves whose frequencies vary within a specified band of frequencies, having inserted therein periodically-spaced transistors capable of avalanche multiplication, each of said transistors having base, emitter, and collector electrodes, the collector-emitter path of each of said transistors being serially inserted in said line; means for biasing said transistors to operate within the avalanche multiplication region; a capacitor, connected in parallel with other impedance means and connected between said base and emitter electrodes of each said transistors, for shaping the impedance characteristic of its associated avalanche transistor nad for rendering the real component of the negative impedance presented by said avalanche transistor positive at approximately the upper limit of said band of frequencies, said upper limit of said band of frequencies, approximately at which said real component becomes positive, being decreased when the value of capacitance of said capacitor is increased.

References Cited in the file of this patent

UNITED STATES PATENTS

| | | |
|---|---|---|
| 1,951,416 | Hund | Mar. 20, 1934 |
| 2,101,688 | Rechnitzer | Dec. 7, 1937 |
| 2,585,078 | Barney | Feb. 12, 1952 |

OTHER REFERENCES

Kauke: "Negative Resistance in Germanium Diodes," Radio Electronic Engineering, April 1953, pp. 8–10.